United States Patent
Chin et al.

(10) Patent No.: US 8,081,949 B2
(45) Date of Patent: Dec. 20, 2011

(54) METHODS AND SYSTEMS FOR ENHANCED SLEEP REQUEST MESSAGES FOR MULTI-MODE OPERATIONS

(75) Inventors: Tom Chin, San Diego, CA (US);
Kuo-Chun Lee, San Diego, CA (US);
Guangming Carl Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 12/425,529

(22) Filed: Apr. 17, 2009

(65) Prior Publication Data

US 2010/0267410 A1   Oct. 21, 2010

(51) Int. Cl.
*H04B 1/16* (2006.01)
(52) U.S. Cl. .................... 455/343.1; 455/458
(58) Field of Classification Search ............. 455/343.1, 455/458, 459, 461, 455, 422.1, 343.2, 343.4
See application file for complete search history.

(56) References Cited

U.S. PATENT DOCUMENTS

| | | | |
|---|---|---|---|
| 7,917,113 B2* | 3/2011 | Palenius et al. .............. | 455/208 |
| 2003/0152044 A1 | 8/2003 | Turner | |
| 2005/0128990 A1 | 6/2005 | Eom et al. | |
| 2007/0183383 A1 | 8/2007 | Bitran et al. | |
| 2008/0207230 A1* | 8/2008 | Jung et al. .................... | 455/458 |
| 2010/0234010 A1* | 9/2010 | Fischer ...................... | 455/422.1 |

FOREIGN PATENT DOCUMENTS

WO   WO2004091231   10/2004

OTHER PUBLICATIONS

IEEE Standards: Draft Amendment to IEEE Standard for Local and Metropolitan Area Networks: Part 16: Air Interface for Fixed and Mobile Broadband Wireless Access Systems, IEEE P802.16e/D12, (Oct. 14, 2005), XP002591813, pp. 96-102, paragraphs 6.3.2.3.44 and 6.3.2.3.45.
International Search Report and Written Opinion—PCT/US2010/031440, International Search Authority—European Patent Office—Jul. 29, 2010.

* cited by examiner

*Primary Examiner* — Peguy Jean Pierre
(74) *Attorney, Agent, or Firm* — Charles Chesney

(57) ABSTRACT

Embodiments of the present disclosure may provide a method of managing multi-mode operations such that a multi-mode MS may utilize the WiMAX sleep mode for monitoring the paging intervals of other supported radio access technologies. For example, certain embodiments may enable the MS to determine a set of WiMAX sleep mode parameters that align a WiMAX sleep window with a CDMA page listening window. Additionally, certain embodiments may provide enhanced MOB_SLP-REQ and MOB_SLP-RSP messages enabling the multi-mode MS to establish a WiMAX sleep mode based on the previously determined WiMAX sleep mode parameters. As a result, embodiments of the present disclosure may enable an MS to manage multi-mode operations, such that the MS 430 may better employ the WiMAX sleep mode for switching from the WiMAX network to the CDMA network to listen for CDMA paging.

38 Claims, 10 Drawing Sheets

METHODS AND SYSTEMS FOR ENHANCED SLEEP REQUEST MESSAGES FOR MULTI-MODE OPERATIONS

TECHNICAL FIELD

Certain embodiments of the present disclosure generally relate to wireless communication and, more particularly, to managing multi-mode operations by a Mobile Station (MS) in a multi-radio access technology (RAT) environment.

SUMMARY

Certain embodiments of the present disclosure provide a method for communicating by a multi-mode mobile station (MS) with first and second networks via first and second radio access technologies (RATs). The method generally includes measuring a time cross-reference between frames of the first RAT and frames of the second RAT while maintaining a connection with the first network via the first RAT, sending a request to a base station of the first network to establish a sleep mode period during which the MS may switch to the second network to monitor for paging messages, and switching to the second network to monitor for paging messages during a sleep window of the sleep mode period of the first network without terminating the connection with the first network.

Certain embodiments of the present disclosure provide an apparatus for communicating with first and second networks via first and second radio access technologies (RATs). The apparatus generally includes logic for measuring a time cross-reference between frames of the first RAT and frames of the second RAT while maintaining a connection with the first network via the first RAT, logic for sending a request to a base station of the first network to establish a sleep mode period during which the apparatus may switch to the second network to monitor for paging messages, and logic for switching to the second network to monitor for paging messages during a sleep window of the sleep mode period of the first network without terminating the connection with the first network.

Certain embodiments of the present disclosure provide an apparatus for communicating with first and second networks via first and second radio access technologies (RATs). The apparatus generally includes means for measuring a time cross-reference between frames of the first RAT and frames of the second RAT while maintaining a connection with the first network via the first RAT, means for sending a request to a base station of the first network to establish a sleep mode period during which the apparatus may switch to the second network to monitor for paging messages, and means for switching to the second network to monitor for paging messages during a sleep window of the sleep mode period of the first network without terminating the connection with the first network.

Certain embodiments of the present disclosure provide a computer-program product for communicating by a multi-mode mobile station (MS) with first and second networks via first and second radio access technologies (RATs), comprising a computer readable medium having instructions stored thereon, the instructions being executable by one or more processors. The instructions generally include instructions for measuring a time cross-reference between frames of the first RAT and frames of the second RAT while maintaining a connection with the first network via the first RAT, instructions for sending a request to a base station of the first network to establish a sleep mode period during which the MS may switch to the second network to monitor for paging messages, and instructions for switching to the second network to monitor for paging messages during a sleep window of the sleep mode period of the first network without terminating the connection with the first network.

In certain embodiments presented herein, including one or more of the summary paragraphs above, at least one of the first and second RATs can include a RAT in accordance with one or more standards of the Institute of Electrical and Electronics Engineers (IEEE) 802.16 family of standards, and/or at least one of the first and second RATs can include a code division multiple access (CDMA) RAT.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
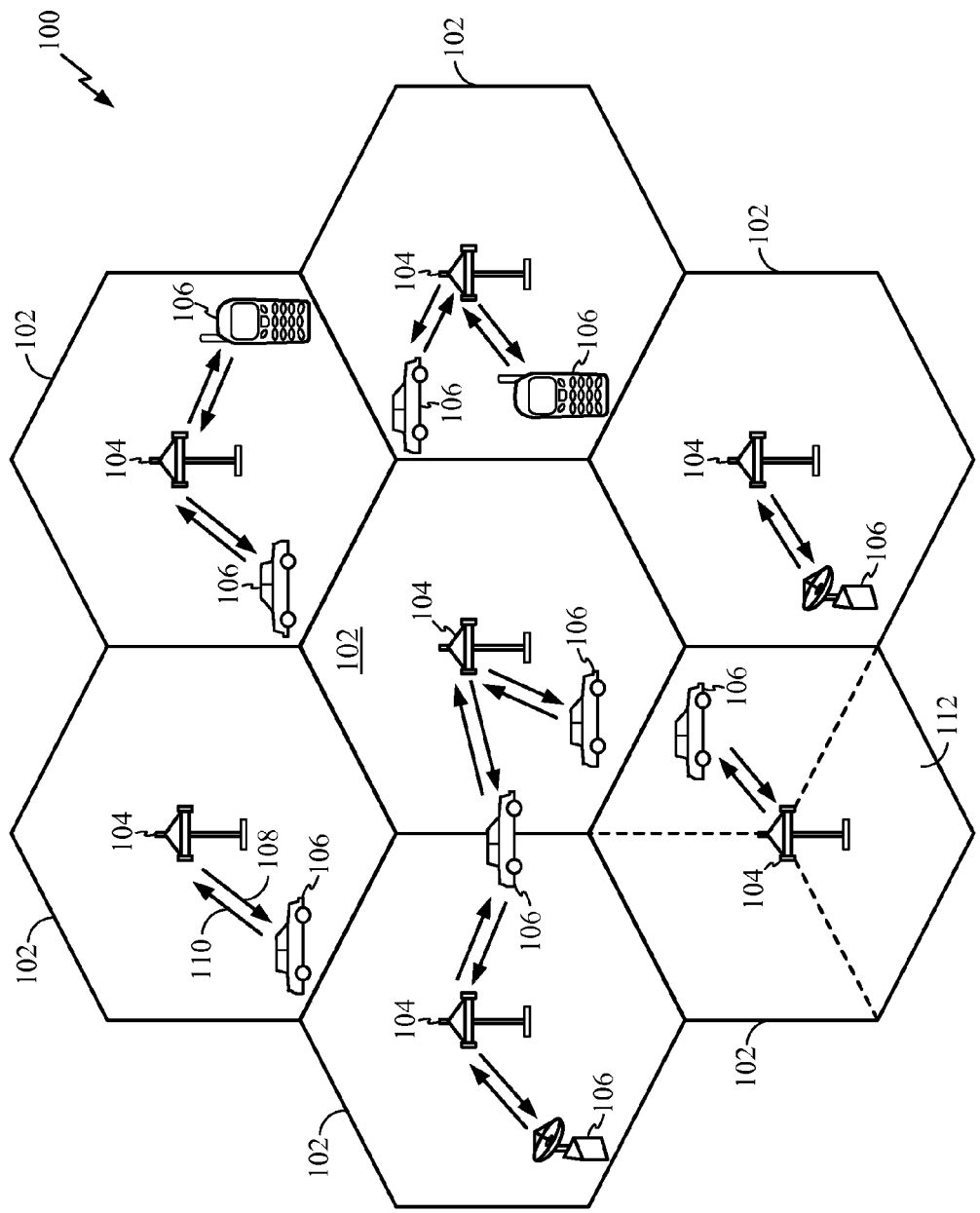
FIG. 1 illustrates an example wireless communication system, in accordance with certain embodiments of the present disclosure.

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

In order to expand the services available to subscribers, some MSs support communications with multiple radio access technologies (RATs). For example, a multi-mode MS may support WiMAX for broadband data services and code division multiple access (CDMA) for voice services.

Embodiments of the present disclosure may provide a method of managing multi-mode operations such that a multi-mode MS 430 may utilize the WiMAX sleep mode for monitoring the paging intervals of other supported RATs. For example, certain embodiments may enable the MS 430 to determine a set of WiMAX sleep mode parameters that align a WiMAX sleep window with a CDMA page listening window. Additionally, certain embodiments may provide enhanced MOB_SLP-REQ and MOB_SLP-RSP messages enabling the multi-mode MS 430 to establish a WiMAX sleep mode based on the previously determined WiMAX sleep mode parameters. As a result, embodiments of the present disclosure may enable an MS 430 to manage multi-mode operations, such that the MS 430 may better employ the WiMAX sleep mode for switching from the WiMAX network to the CDMA network to listen for CDMA paging.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
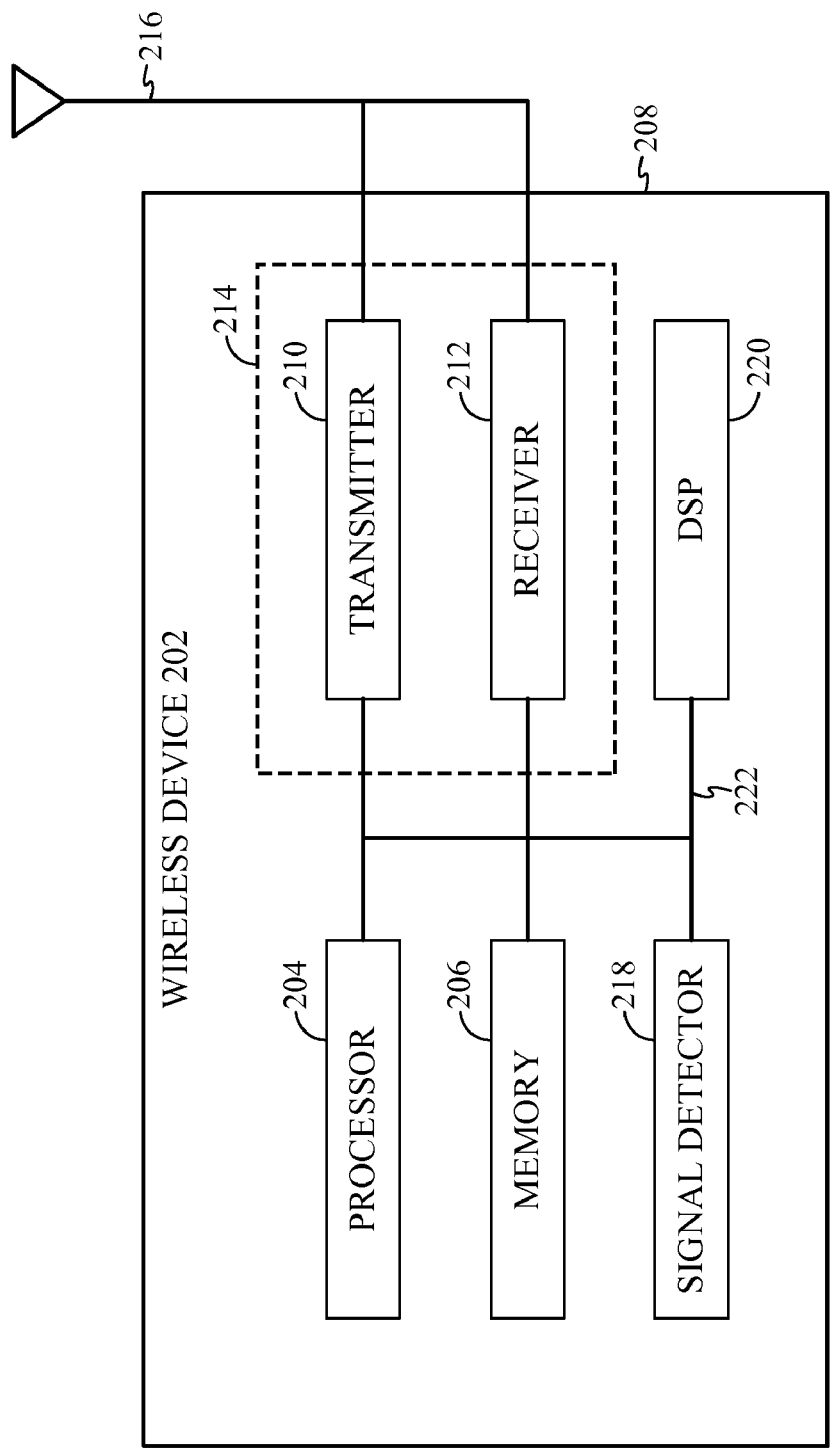
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
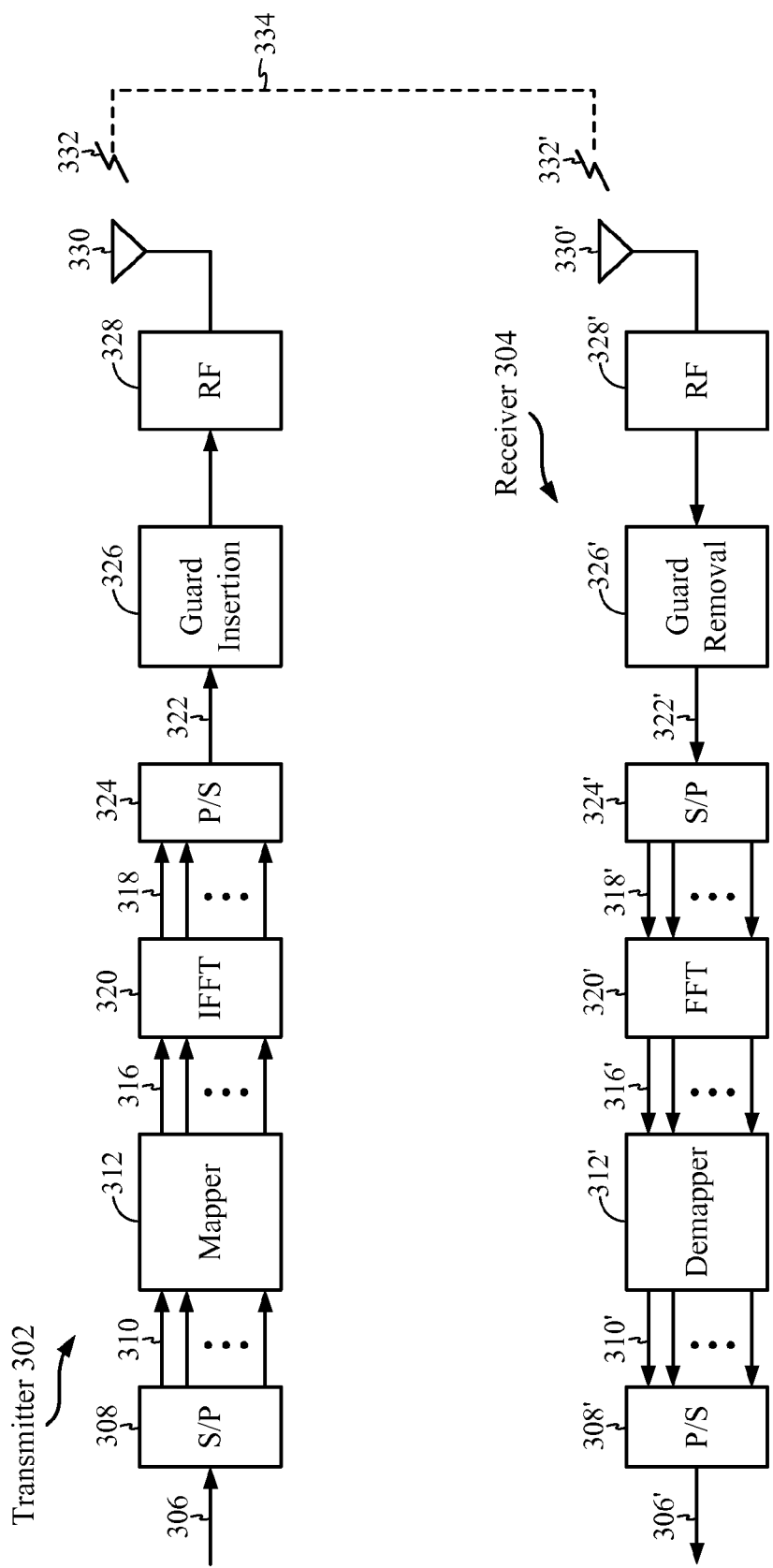
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

As stated above, WiMAX wireless communication systems based on the IEEE 802.16 standard use a network of base stations mounted to service towers to communicate with wireless devices (i.e., mobile stations). Each base station (BS) emits and receives radio frequency (RF) signals that convey data to and from the mobile stations (MS) (e.g., cell phones, laptop computers, etc.). Similarly, other radio access technologies (RATs) use a network of base stations to communicate with one or more wireless devices. For example, the Universal Mobile Telecommunication System (UMTS), Global System for Mobile communications (GSM), and Ultra Mobile Broadband (UMB) technologies may all employ a plurality of BSs to receive and transmit RF signals that convey data to and from MSs. Since a single service tower may physically support a plurality of base stations for a variety of RATs, a given geographic area may be within the coverage area of more than one radio access technology.

Figure 4:
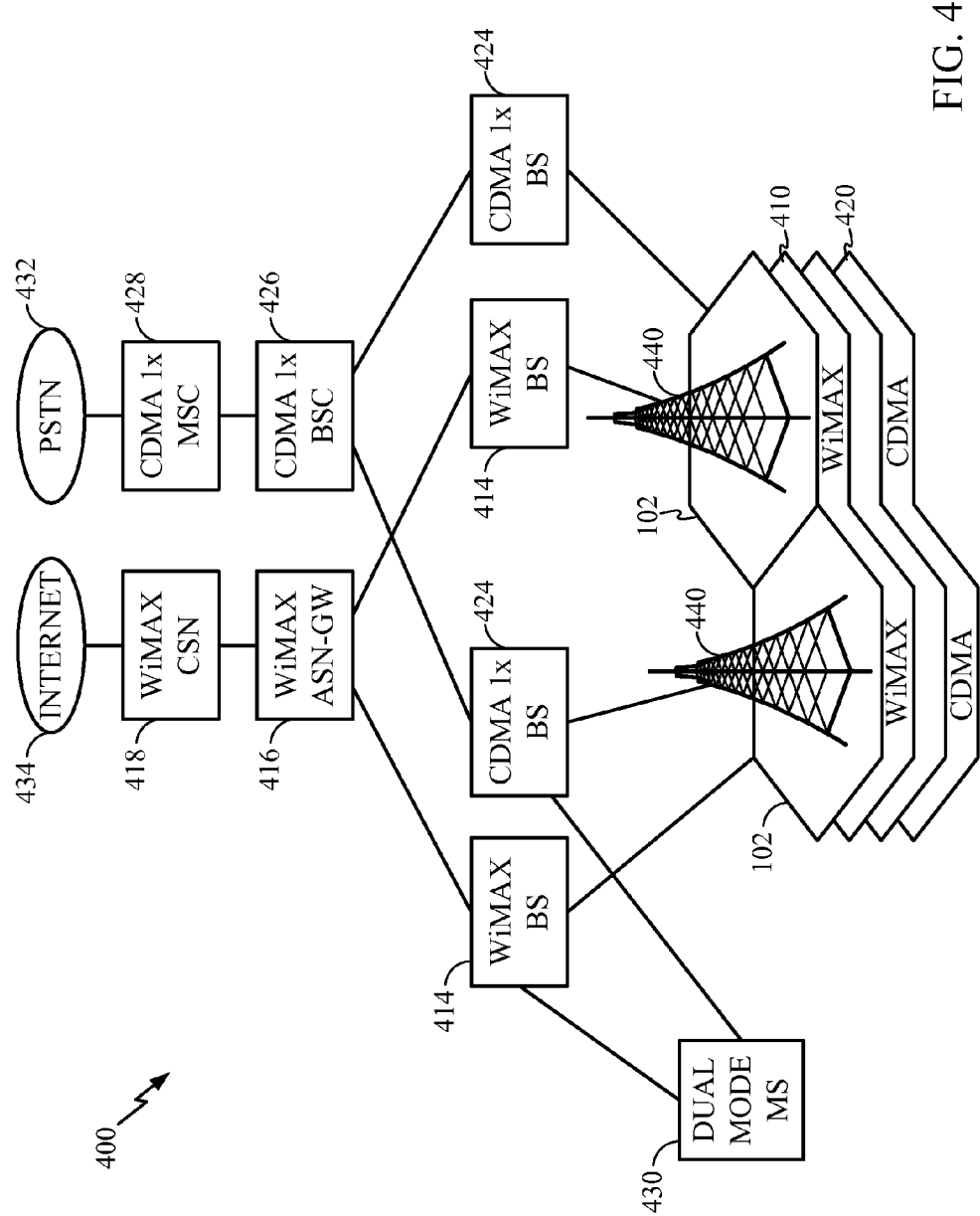
FIG. 4 illustrates an example WiMAX network overlaid on a code division multiple access (CDMA) 1× network.

For example, FIG. 4 illustrates a system 400 in which a mobile WiMAX network 410 may be combined with (or "overlaid" on) a code division multiple access (CDMA) 1× network 420 to provide both broadband data and voice service. In the system, subscribers may utilize a single multi-mode mobile station (MS) to tune between two or more supported RATs. For example, subscribers may utilize a multi-mode MS 430 to tune to the CDMA network to utilize a public switched telephone network (PSTN) 432 and to tune to the WiMAX network to utilize a broadband data service in accessing the internet 434.

CDMA service may be provided to a geographic area by a plurality of hardware and software components. For example, a CDMA BS 424 may contain equipment for encrypting and decrypting communications with a Base Station Controller (BSC) 426, which may provide intelligent control for multiple CDMA BSs. A BSC 426 may have tens or even hundreds of BSs under its control. The BSC 426 may handle the allocation of radio channels, receive measurements from the multi-mode MSs 430, or control handovers from one BS to another BS. Further, the BSC 426 may act as a concentrator where a plurality of low capacity connections to BSs becomes reduced to a smaller number of connections towards the Mobile Switching Center (MSC) 428.

The MSC 428 may serve as a primary service delivery node for the CDMA network. It may be responsible for handling voice calls and text messages (SMSs), specifically, setting up and releasing end-to-end connections, handling mobility and handover requirements during the call, and taking care of charging and real time pre-paid account monitoring. Additionally, a MSC 428 may determine the location of an MS that is being called and may interface with a landline, such as a Public Switched Telephone Network (PSTN).

Similar to the BSC 426, the access service network gateway (ASN-GW) 416 may control multiple BSs 414 in the WiMAX network 410. The ASN-GW 416 may allocate channels, receive measurements from the multi-mode MSs 430, and control handovers from one BS to another BS. The ASN-GW 416 may allow a multi-mode MS 430 to access the internet 434 via an internet service provider's connectivity service network (CSN) 418. The CSN 418 may provide, among other things, Authentication, Accounting, Authorization (AAA), Domain Name System (DNS), Dynamic Host Configuration Protocol (DHCP), and firewall services for the internet service provider.

However, some MSs 430 may only have a single RF chain limiting the multi-mode MS 430 to a connection with a single RAT at a time while concurrently idle with respect to other RATs supported by the MS. Consequently, the MS 430 may periodically switch between RATs to listen to the paging channels for each supported RAT based on a paging schedule corresponding to each RAT. However, in some instances the paging schedule of the supported RATs may conflict. For example, the paging interval of two or more RATs may overlap.

Exemplary Enhanced WiMAX MOB SLP-REQ Messages for Multi-Mode Operation

Accordingly, what is needed is an improved technique for an MS to manage multi-mode operations in a multi-RAT environment. Fortunately, under current versions of the IEEE 802.16 standard (e.g., Rev2/D5), the WiMAX sleep mode may be used for multi-mode operations. For example, the MS may continue data activity during periods of availability while utilizing unavailable periods to periodically tune to a CDMA or UMTS network to listen for paging messages.

However, current versions of the IEEE 802.16 standard may limit the multi-mode MS's performance in a multi-RAT environment. For example, under current versions of the standard, an MS may determine a set of WiMAX sleep parameters, including an initial sleep window, a listening window, a start frame number, etc. But, the WiMAX BS may deny a sleep request or suggest alternative sleep parameter values. However, for an MS to utilize the WiMAX sleep mode for multi-mode operations, the MS may need to determine the proper start frame number and other WiMAX sleep parameters in order to align the WiMAX sleep intervals with the paging listening intervals of other supported networks.

Additionally, the mobile sleep request (MOB_SLP-REQ) and mobile sleep response (MOB_SLP-RSP) messages used to negotiate the WiMAX sleep mode have certain attributes which may limit the multi-mode MS's ability to manage multi-mode operations in a multi-RAT environment.

For example, the start frame number field found in MOB_SLP-REQ and MOB_SLP-RSP messages contains 7 bits. Additionally, under current versions of the standard, a WiMAX frame is 5 milliseconds in length. Consequently, with a 7 bit start frame number field, the MS may be limited to selecting a start frame number within the subsequent 127 frames or 0.635 seconds. Selecting a start frame number within the subsequent 0.635 seconds may limit the multi-mode MS's ability to align the WiMAX sleep intervals with the paging listening intervals of other supported networks.

Accordingly, embodiments of the present disclosure may provide a method of managing multi-mode operations such that an MS may utilize the WiMAX sleep mode for multi-mode operations. For example, certain embodiments may enable the MS to determine a set of WiMAX sleep mode parameters that align a WiMAX sleep window with a CDMA page listening window. Additionally, certain embodiments may provide enhanced MOB_SLP-REQ and MOB_SLP-RSP messages enabling the MS to establish a WiMAX sleep mode based on the previously determined WiMAX sleep mode parameters. As a result, embodiments of the present disclosure may enable an MS to manage multi-mode operations, such that the MS may better employ the WiMAX sleep mode for switching from the WiMAX network to the CDMA network to listen for CDMA paging messages.

Figure 5:
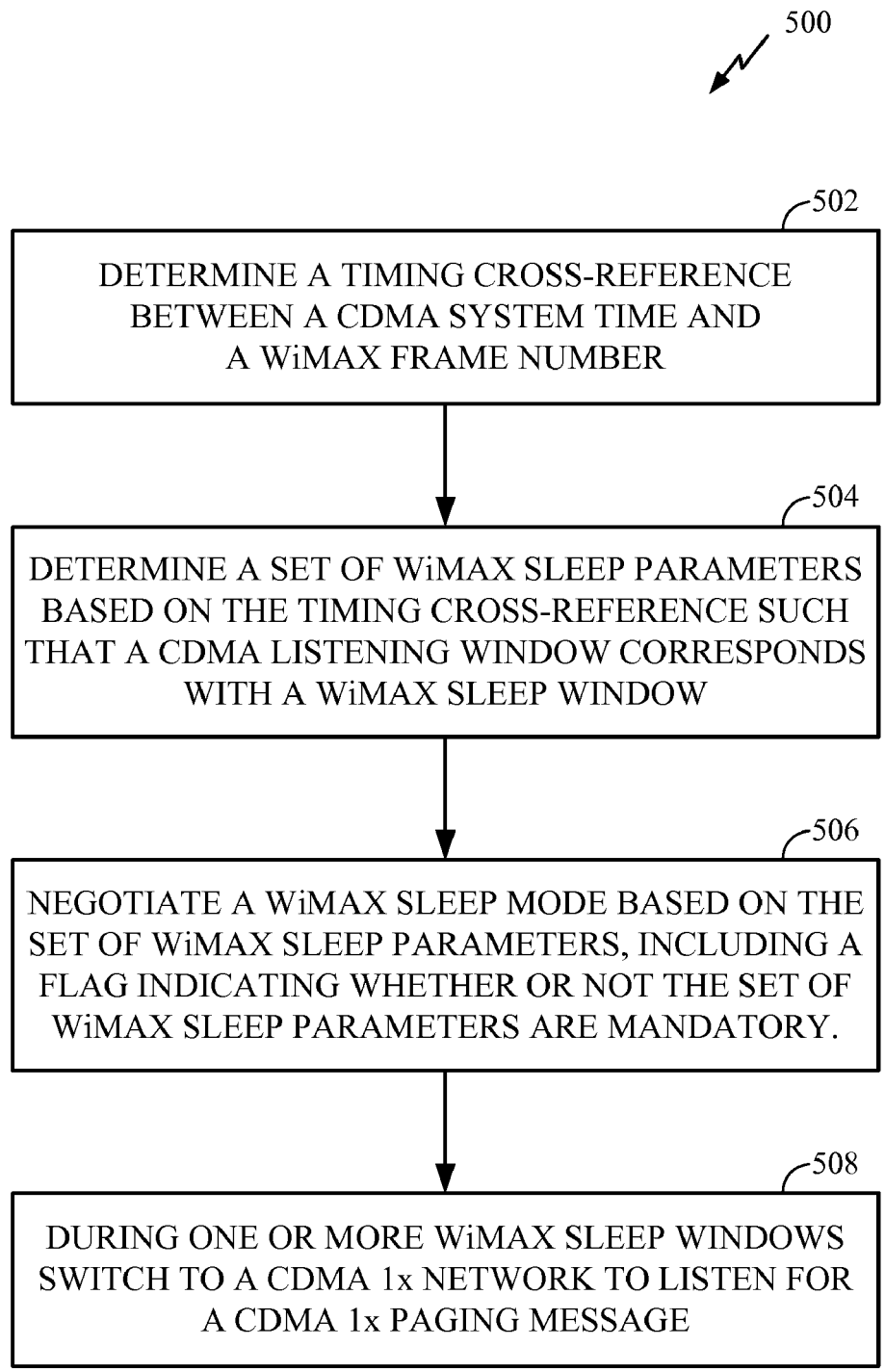
FIG. 5 illustrates example operations for switching from a WiMAX network to a CDMA 1× network, in accordance with embodiments of the present disclosure.

FIG. 5 illustrates example operations 500 that may be performed, for example, by an MS, for managing multi-mode paging operations, in accordance with certain embodiments of the present disclosure. The operations 500 may be performed, for example, by an MS in an effort to allow the MS to establish a WiMAX sleep mode in which the WiMAX sleep window aligns with the page listening window of a CDMA network.

Figure 6:
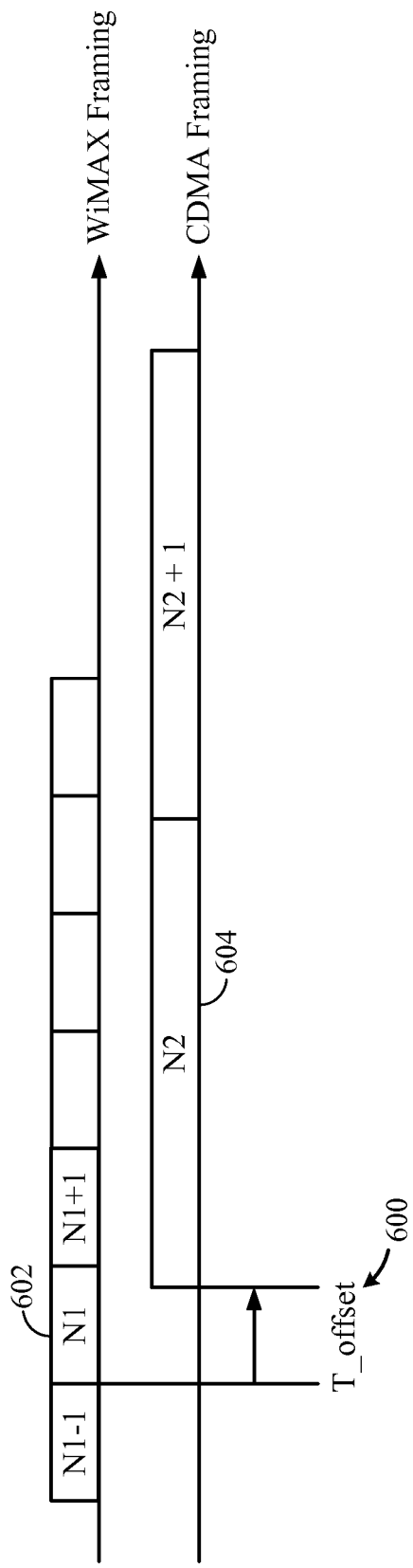
FIG. 6 illustrates an example time cross-reference between frames in a WiMAX communication and frames in a CDMA 1× communication.

Operations 500 begin, at 502, with the MS measuring a timing cross-reference between the start of a WiMAX frame and the start of a CDMA frame. Such a cross-reference is shown in FIG. 6 between the start of an arbitrary WiMAX frame 602 with frame number N1 and the start of the corresponding CDMA frame 604 with CDMA system time (in frame number) N2, with some time delay T_offset 600. To measure the CDMA frame timing, the MS may require a scanning interval in which to switch from the WiMAX network to the CDMA network. While measuring the timing cross-reference, the MS may also determine the WiMAX frame number and the corresponding CDMA system time in CDMA frames. It should be noted that a WiMAX frame (T_wm_frame) may have a shorter duration than a CDMA frame. For example, a traditional CDMA frame may have a duration of 20 milliseconds while a comparable WiMAX frame may be 5 milliseconds.

At 504, the MS may determine a set of WiMAX parameters based on the previously calculated timing cross-reference. The WiMAX parameters determined by the MS may include, but are not limited to, the initial sleep window duration, the listening window duration, and the WiMAX start frame number.

In some instances (e.g., instances in which the MS is monitoring only a paging channel (PCH)), the initial sleep duration (in units of WiMAX frames) may be determined as described by Equation 1:

$$\text{Initial\_Sleep\_Duration} = \frac{80 \text{ ms}}{\text{T\_wm\_frame}} + d1 + d2, \qquad (1)$$

where d1 and d2 are the additional number of WiMAX frame(s) reserved (in addition to sleep window) for the MS to tune to the CDMA network and to tune back to the WiMAX network, respectively, and where T_wm_frame may be, for example, 2, 2.5, 5, 10, or 20 ms.

However, in some instances (e.g., instances in which the MS is monitoring a PCH and a quick paging channel (QPCH)) the initial sleep duration (in units of WiMAX frames) may be determined as described by Equation 2:

$$\text{Initial\_Sleep\_Duration} = \frac{180 \text{ ms}}{\text{T\_wm\_frame}} + d1 + d2. \qquad (2)$$

Since the MS must listen to both the CDMA paging channel and the CDMA quick paging channel, the required listening time may be larger than in previously described embodiments.

Current versions of the IEEE 802.16 standard limit the listening window duration field to a maximum of 8 bits. With 8 bits, the duration of a WiMAX listening window may be limited to 255 frames. Specifically, a WiMAX listening window duration may be determined by taking the maximum value of a set of numbers, k, that satisfy the following two conditions:

$$k < 256; \text{ and} \quad (3)$$

$$\frac{1.28 \text{ sec} * 2^{Slot\_Cycle\_Index} / T\_wm\_frame}{(Initial\_Sleep\_Duration + k)} = \text{Positive Integer.}$$

The above Slot_Cycle_Index is the parameter used to determine the CDMA 1× paging cycle length under CDMA standards. For example, where the duration of a WiMAX frame (T_wm_frame) is 5 milliseconds, the Slot_Cycle_index is 1, and the sleep duration is 20 frames, the numerator of condition 2 above equals 512. Accordingly, the set of numbers, k, that satisfies both conditions includes {236, 108, 44, 12}, and the maximum value of the set of numbers (i.e. the duration of the listening window, in units of WiMAX frames) is thus 236. It should be noted that the Slot_Cycle_Index may be determined from previous MS activity in the CDMA network.

Certain embodiments of the present disclosure may provide enhanced MOB_SLP-REQ and MOB_SLP-RSP messages. For example, certain embodiments may provide MOB_SLP-REQ and MOB_SLP-RSP messages with a 16-bit listening window duration field, rather than an 8-bit field. With 16 bits, the duration of a WiMAX listening window may be extended to 65,535 frames. Accordingly, when employing enhanced MOB_SLP-REQ and MOB_SLP-RSP messages, the WiMAX listening window duration may be determined as described by Equation 4:

$$\left(\frac{1.28 \text{ sec} * 2^{Slot\_Cycle\_Index}}{T\_wm\_frame}\right) - Initial\_Sleep\_Duration. \quad (4)$$

Additionally, when determining a set of WiMAX parameters, the start frame may refer to the least significant 7 bits of the absolute WiMAX frame number. Consequently, embodiments of the present disclosure may allow the WiMAX start frame to be determined as described in Equation 5, when the MS is only monitoring the PCH:

$$Start\_Frame = \left[\frac{20 \text{ ms}}{T\_wm\_frame} * M + N1 - d1\right] \mod 128, \quad (5)$$

where d1 is still the additional number of WiMAX frame(s) reserved (in addition to sleep window) for the MS to tune to the CDMA network and M may be expressed as (4*PGSLOT−N2) mod 64*2^{Slot\_Cycle\_Index}. In this equation, PGSLOT is the parameter used to determine the offset per CDMA 1× paging cycle under CDMA standards and it depends on the International Mobile Station Identifier (IMSI) of the MS.

Additionally, certain embodiments may allow the WiMAX start frame to be determined as described in Equation 6, when the MS is monitoring both the PCH and the QPCH:

$$Start\_Frame = \left[\frac{20 \text{ ms}}{T\_wm\_frame} * M + N1 - \frac{100 \text{ ms}}{T\_wm\_frame} - d1\right] \mod 128. \quad (6)$$

However, as previously described, certain embodiments of the present disclosure may provide enhanced MOB_SLP-REQ and MOB_SLP-RSP messages. For example, certain embodiments may provide MOB_SLP-REQ and MOB_SLP-RSP messages with a 16-bit start frame field. With 16 bits, the start frame of the WiMAX sleep mode may be extended to 65,535 frames. Accordingly, when employing enhanced MOB_SLP-REQ and MOB_SLP-RSP messages the WiMAX start frame may be determined as described by Equation 7 when the MS is only monitoring the PCH and by Equation 8 when the MS is monitoring both the PCH and the QPCH:

$$Start\_Frame = \left(\frac{20 \text{ ms}}{T\_wm\_frame} * M + N1 - d1\right) \mod 65,536, \quad (7)$$

$$Start\_Frame = \quad (8)$$
$$\left(\frac{20 \text{ ms}}{T\_wm\_frame} * M + N1 - \frac{100 \text{ ms}}{T\_wm\_frame} - d1\right) \mod 65,536,$$

where M may again be expressed as (4*PGSLOT−N2) mod 64*2^{Slot\_Cycle\_Index}. The above 65,536 is used because with certain embodiments the listening interval field may have a 16-bit value while the frame number may have a 24-bit value.

At 506, the MS may negotiate a WiMAX sleep mode based on the set of previously determined WiMAX sleep parameters. In certain embodiments, the negotiation may be performed by sending an enhanced MOB_SLP-REQ to the WiMAX BS and receiving a MOB_SLP-RSP in return.

Additionally, the enhanced MOB_SLP-REQ may include a flag indicating whether or not the set of WiMAX sleep parameters are mandatory. For example, if the flag has a bit value of '1' the WiMAX BS may not alter or deny the sleep mode parameters included in the MOB_SLP-REQ. In contrast, if the flag has a bit value of '0' the WiMAX BS may alter or deny the sleep mode parameters in the subsequent MOB_SLP-RSP.

After receiving the MOB_SLP-RSP, confirming the WiMAX sleep mode parameters, the MS may employ the WiMAX sleep mode for multi-mode operations. For example, the MS may enter the WiMAX sleep mode and, at 508, switch to a CDMA 1× network to listen for a CDMA paging message, during one or more of the scheduled sleep intervals of the WiMAX sleep mode.

Figure 7A:
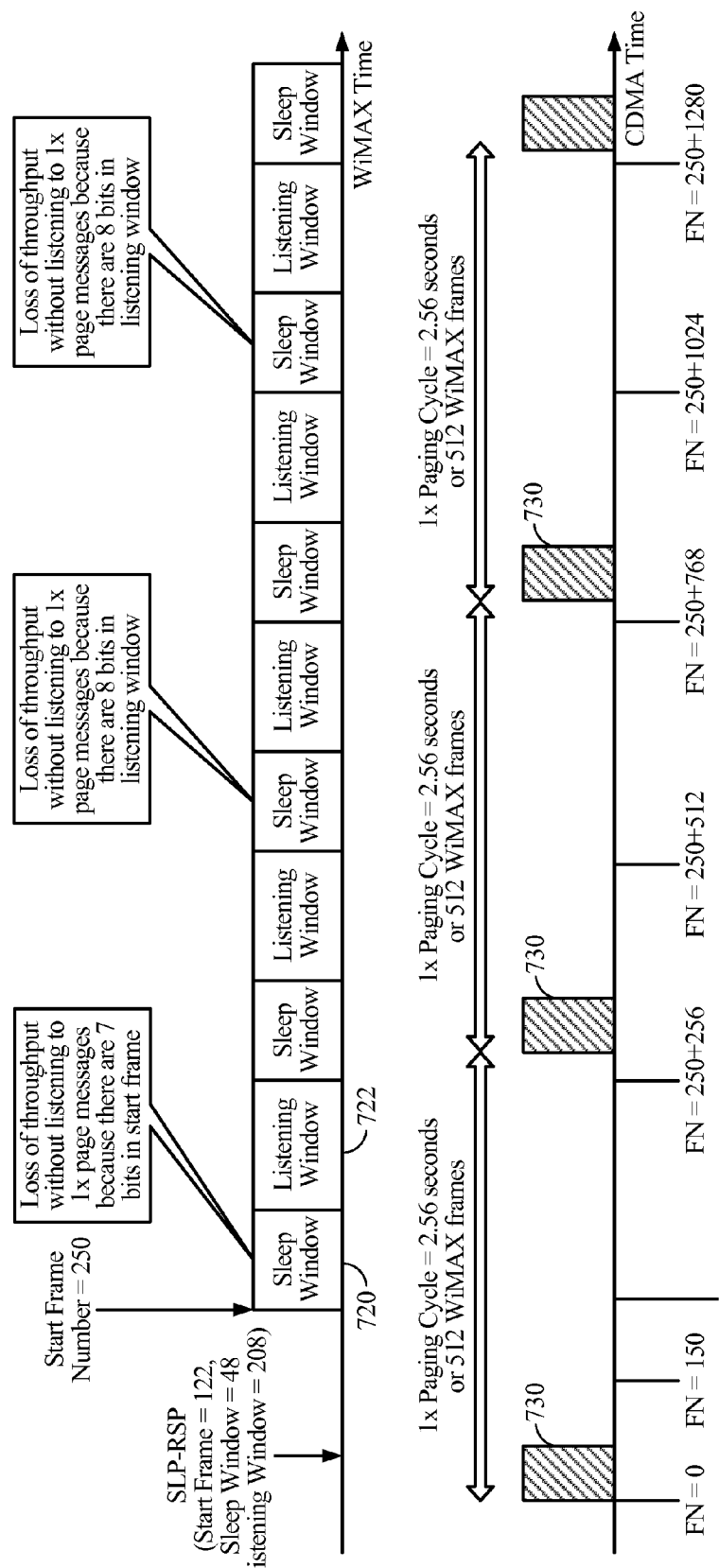
FIG. 7A-B illustrate the alignment of WiMAX sleep intervals with CDMA 1× paging windows based on parameters determined from a time cross-reference measurement, in accordance with embodiments of the present disclosure.

FIG. 7A illustrates how, for certain embodiments, the WiMAX sleep windows 720 may be timed such that the MS has sufficient time to tune from the WiMAX network to the CDMA network and listen to a CDMA paging channel for an entire paging window during a single WiMAX sleep window 720. However, in certain embodiments, the WiMAX sleep window 720 may be insufficient in length to allow the MS to listen to an entire CDMA paging window. In such embodiments, the MS may tune to the CDMA network just long enough to listen to a CDMA paging channel slot corresponding to the paging channel slot assigned to the MS during a CDMA paging window 730. For certain embodiments, the multi-mode MS 430 may switch back to the WiMAX network after listening to the CDMA paging channel slot but before the end of the CDMA paging window 730.

Additionally, it should be noted that, due to the limited size of the WiMAX listening window 722 and sleep window 720 allowable under current versions of the WiMAX standards, in certain embodiments, more than one WiMAX sleep cycle may occur between subsequent CDMA paging windows 730, as illustrated in FIG. 7A. Accordingly, the MS may not tune to the CDMA network during every WiMAX sleep window 720. During WiMAX sleep windows 720 that do not align with CDMA paging windows, the MS may simply sleep or scan.

Consequently, for certain embodiments which do not use an enhanced MOB_SLP-REQ or MOB_SLP-RSP message, there may be a loss of throughput on the WiMAX network without the benefit of listening for paging messages on the CDMA network.

Additionally, since the start frame number field of MOB_SLP-REQ or MOB_SLP-RSP messages, in certain embodiments, may have a maximum of 127 frames (7 bits) but the total duration of the sleep window and the listening window may be set to 255 frames (8 bits), the MS may be unable to properly align the WiMAX sleep window with the CDMA page listening window.

For example, the MS may need to send the MOB_SLP-REQ message L frames prior to the sleep mode start frame. Since the time required by the MS to send a MOB_SLP-REQ, receive a MOB_SLP-RSP, and process the messages may vary with transmission conditions, the MS 430 may send the MOB_SLP-REQ more than 128 frames prior to the desired start frame of the sleep mode. However, within every 256 WiMAX frames (i.e., a single WiMAX sleep window and listening window pair) there may be two frames which may have an identical least significant 7 bits. Consequently, a 7-bit start frame value, in which the value is based on the 7 LSB of the absolute WiMAX frame number, may be indefinite in specifying a specific start frame within a 256 frame cycle.

Accordingly, certain embodiments may select an L value such that the BS can reply with a MOB_SLP-RSP within 127 frames before the next absolute frame number with LSB 8 bits matching with k in Equation 3. For example, the condition: L<128 may also be met.

In cases in which the WiMAX BS 414 responds later than the planned start frame, a situation which may lead to the previously described indefinite start frame challenge, the MS may deactivate the PSC and re-send sleep request message to activate PSC with the previous time constraint to avoid the indefinite start frame situation.

In contrast, embodiments employing enhanced MOB_SLP-REQ and MOB_SLP-RSP messages may avoid some of the previously described challenges. For example, since enhanced MOB_SLP-REQ and MOB_SLP-RSP messages may have a 16-bit listening window field and a 16-bit start frame number field, an MS may avoid the 128 frame offset challenge.

Figure 7B:
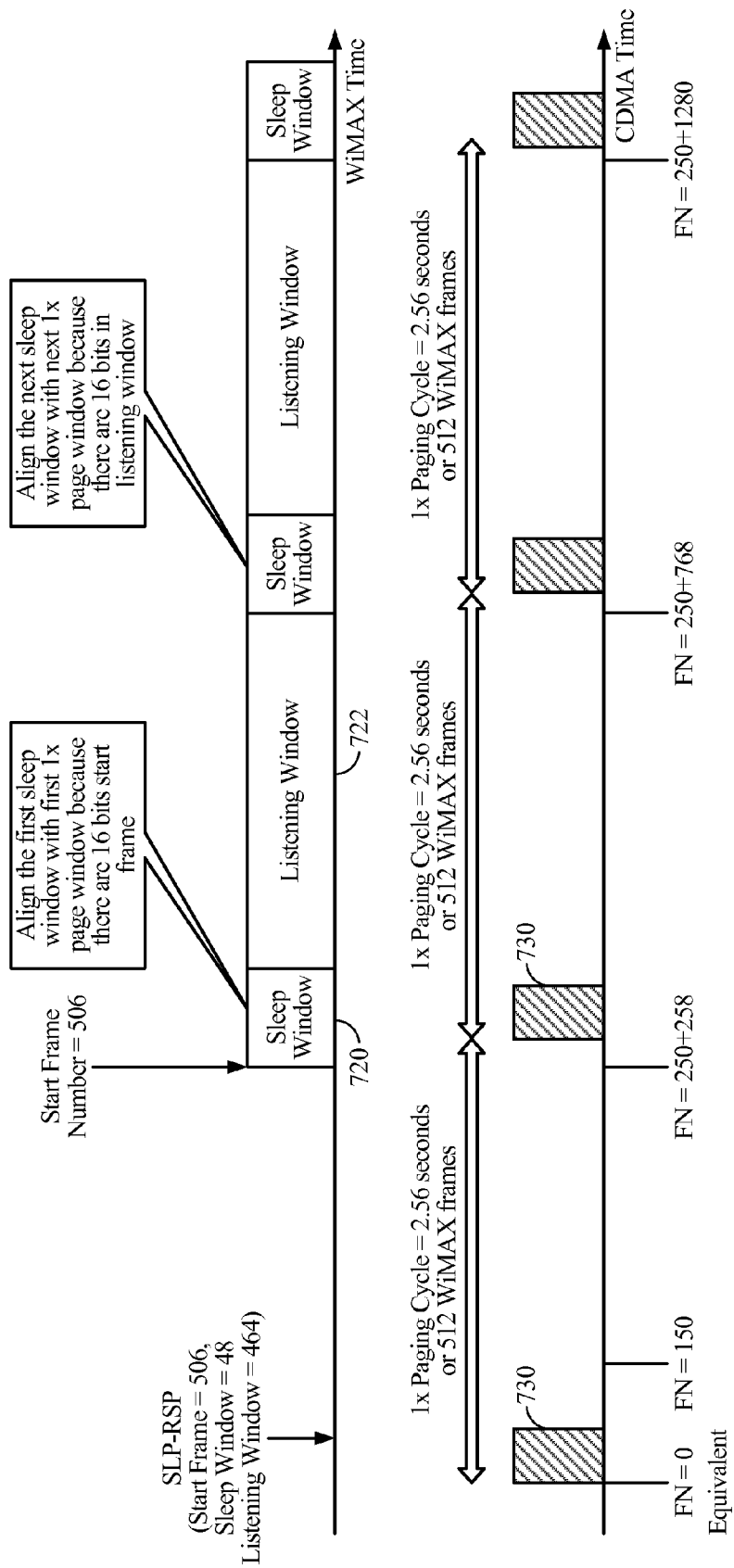

In fact, by employing enhanced MOB_SLP-REQ and MOB_SLP-RSP messages, the MS may be able to configure the WiMAX sleep mode such that each WiMAX sleep window aligns with a CDMA page listening window, as illustrated in FIG. 7B. Consequently, the MS may be able to reduce the previously described unnecessary loss of WiMAX throughput.

Figure 8:
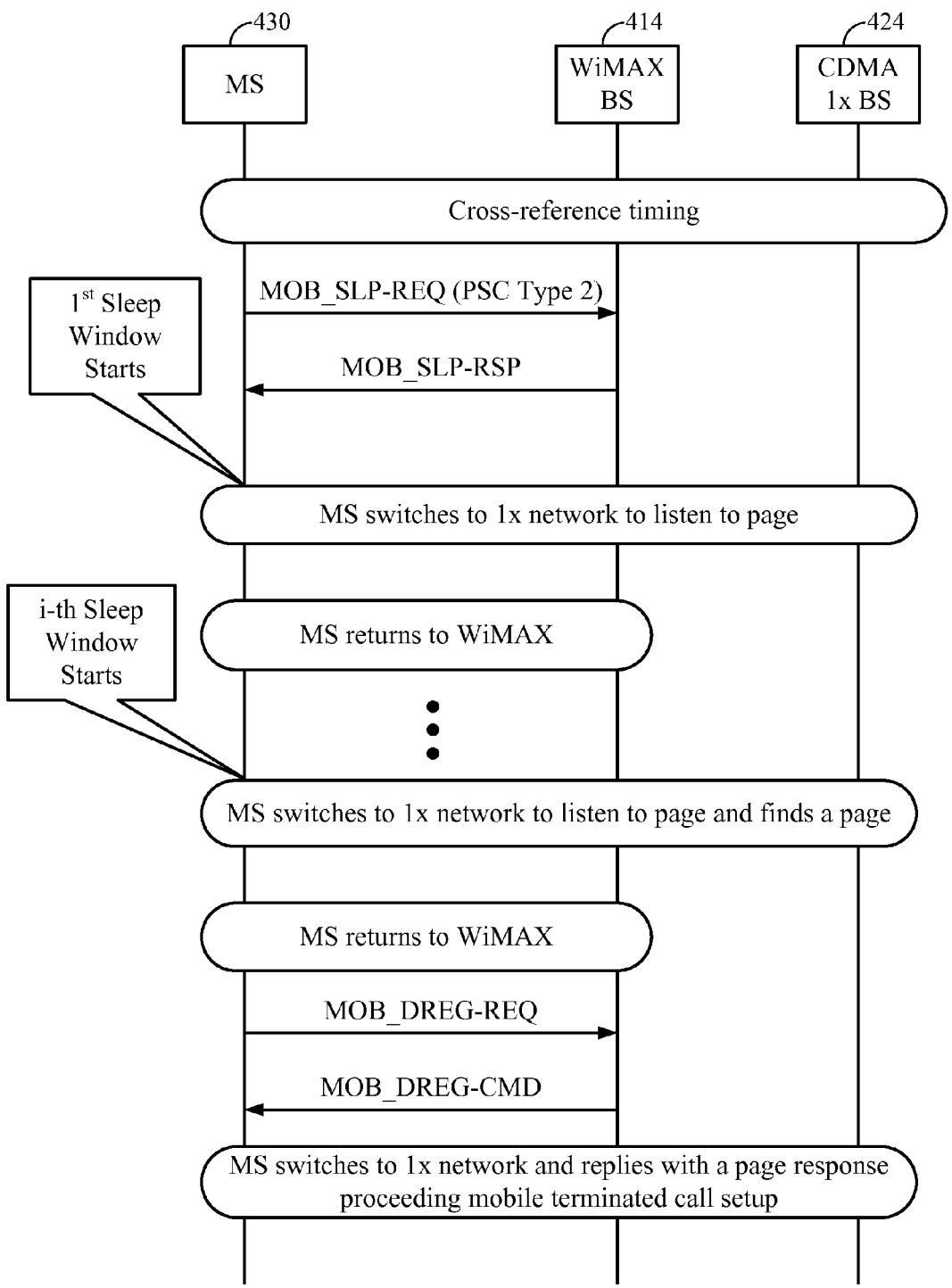
FIG. 8 illustrates example exchanges between a multi-mode mobile station and a WiMAX and CDMA base station, in accordance with embodiments of the present disclosure.

In short, FIG. 8 summarizes the previously described exchanges between a multi-mode mobile station and a WiMAX and CDMA base station. After being granted with the sleep mode, an MS may periodically switch to the CDMA 1× network to listen to the 1× pages. If there is no page destined for the MS, the MS may return to the WiMAX network to continue data service. However, if there is a page for the MS, the MS may switch back to WiMAX network and send a deregistration request (MOB_DREG-REQ) message requesting a transition to an idle mode before setting up the call with the CDMA 1× network. After returning to the CDMA 1× network, the MS may then reply with a page response and prepare for a 1× mobile terminated call setup.

It should be noted that the previously described embodiments may employ a power saving class (PSC) of type 2. Additionally, the type 2 PSC may include all of the associated transport connections as well as the basic and primary management connections.

Moreover, in order to perform 1× registration or acquire the overhead parameter messages, an MS may first request to deactivate the PSC of type 2. The MS may then request to activate another PSC of type 3 for a one-time sleep window which is long enough to cover the MS's absence from the WiMAX network. This may be done by sending a mobile sleep request (MOB_SLP-REQ) wherein the start frame number matches the start of the 1× registration or system overhead acquisition. Additionally, the final window base and final window exponent parameters may be set large enough to cover the process time to perform the 1× registration or the system acquisition.

Figure 5A:
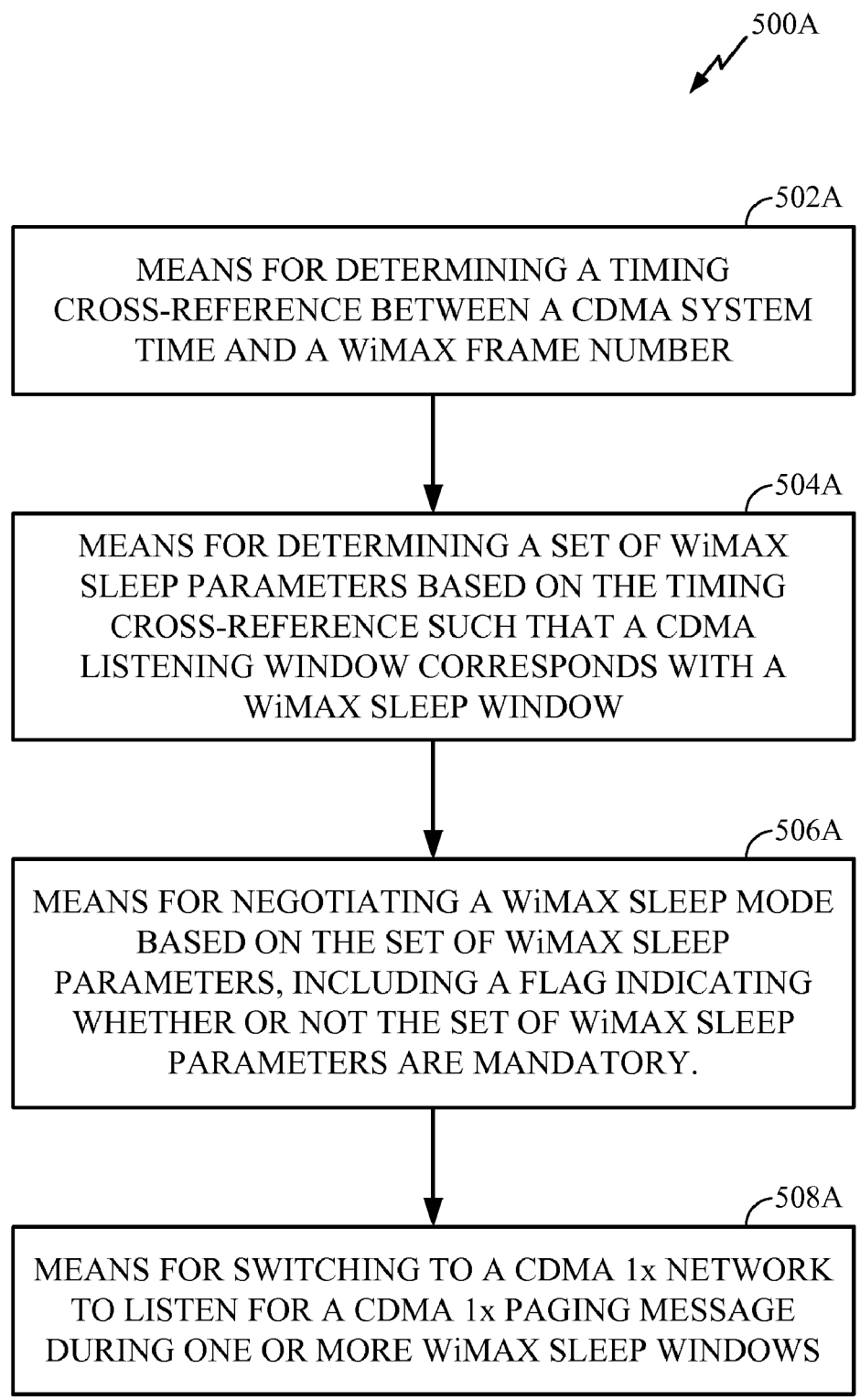
FIG. 5A is a block diagram of means corresponding to the example operations of FIG. 5.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 502-508 illustrated in FIG. 5 correspond to means-plus-function blocks 502A-508A illustrated in FIG. 5A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for communicating by a multi-mode mobile station (MS) with first and second networks via first and second radio access technologies (RATs), comprising:
   measuring a time cross-reference between frames of the first RAT and frames of the second RAT while maintaining a connection with the first network via the first RAT;
   sending a request to a base station of the first network to establish a sleep mode period during which the MS may switch to the second network to monitor for paging messages; and
   switching to the second network to monitor for paging messages during a sleep window of the sleep mode period of the first network without terminating the connection with the first network.

2. The method of claim 1, further comprising:
   terminating the connection with the first network in response to detecting a paging message during a sleep period.

3. The method of claim 2, wherein terminating the connection with the first network comprises:
   switching from the second network to the first network in response to detecting a paging message during the sleep period;
   sending a deregistration request to the first network; and
   switching to back to the second network to reply to the previously detected paging message.

4. The method of claim 1, wherein measuring a time cross-reference between frames of the first RAT and frames of the second RAT comprises:
   determining a frame number of frames of the first RAT;
   determining a frame number of the corresponding frames of the second RAT; and
   calculating a time cross-reference based on a scaling factor selected to compensate for the difference in length of frames of the first RAT and frames of the second RAT.

5. The method of claim 1, further comprising:
   calculating a start frame, a sleep window duration, and a listening window duration based, at least, on the time cross-reference; and
   wherein the sleep mode period request message contains the calculated start frame, sleep window duration, and listening window duration to initiate sleep mode operations with sleep windows that align with paging cycles of the second RAT.

6. The method of claim 5, wherein the sleep mode period request message is an enhanced mobile sleep request (MOB_SLP-REQ) message configured with a 16-bit start frame field, a 16-bit listening window duration field, and a flag indicating whether or not the calculated start frame, sleep window duration, and listening window duration are mandatory.

7. The method of claim 5, further comprising:
   receiving a mobile sleep response message from the base station of the first network after the occurrence of the previously calculated start frame included in the sleep mode period request message;
   cancelling the previously sent sleep mode period request message;
   calculating a new start frame based, at least, on the time cross-reference; and sending a new sleep mode period request message to the base station of the first network, wherein the new sleep mode period request message contains the new calculated start frame.

8. The method of claim 1, further comprising:
sending a request to a base station of the first network to establish a one-time sleep mode period to perform an action in the second network.

9. The method of claim 8, wherein the action comprises performing a registration in the second network.

10. The method of claim 8, wherein the action comprises reading one or more overhead parameter messages in the second network.

11. An apparatus for communicating with first and second networks via first and second radio access technologies (RATs), comprising:
logic for measuring a time cross-reference between frames of the first RAT and frames of the second RAT while maintaining a connection with the first network via the first RAT;
logic for sending a request to a base station of the first network to establish a sleep mode period during which the apparatus may switch to the second network to monitor for paging messages; and
logic for switching to the second network to monitor for paging messages during a sleep window of the sleep mode period of the first network without terminating the connection with the first network.

12. The apparatus of claim 11, further comprising:
logic for terminating the connection with the first network in response to detecting a paging message during a sleep period.

13. The apparatus of claim 12, wherein the logic for terminating the connection with the first network comprises:
logic for switching from the second network to the first network in response to detecting a paging message during the sleep period;
logic for sending a deregistration request to the first network; and
logic for switching to back to the second network to reply to the previously detected paging message.

14. The apparatus of claim 11, wherein the logic for measuring a time cross-reference between frames of the first RAT and frames of the second RAT comprises:
logic for determining a frame number of frames of the first RAT;
logic for determining a frame number of the corresponding frames of the second RAT; and
logic for calculating a time cross-reference based on a scaling factor selected to compensate for the difference in length of frames of the first RAT and frames of the second RAT.

15. The apparatus of claim 11, further comprising:
logic for calculating a start frame, a sleep window duration, and a listening window duration based, at least, on the time cross-reference; and
wherein the sleep mode period request message contains the calculated start frame, sleep window duration, and listening window duration to initiate sleep mode operations with sleep windows that align with paging cycles of the second RAT.

16. The apparatus of claim 15, wherein the sleep mode period request message is an enhanced mobile sleep request (MOB_SLP-REQ) message configured with a 16-bit start frame field, a 16-bit listening window duration field, and a flag indicating whether or not the calculated start frame, sleep window duration, and listening window duration are mandatory.

17. The apparatus of claim 15, further comprising:
logic for receiving a mobile sleep response message from the base station of the first network after the occurrence of the previously calculated start frame included in the sleep mode period request message;
logic for cancelling the previously sent sleep mode period request message;
logic for calculating a new start frame based, at least, on the time cross-reference; and
logic for sending a new sleep mode period request message to the base station of the first network, wherein the new sleep mode period request message contains the new calculated start frame.

18. The apparatus of claim 11, further comprising:
logic for sending a request to a base station of the first network to establish a one-time sleep mode period to perform an action in the second network.

19. The apparatus of claim 18, wherein the action comprises performing a registration in the second network.

20. The apparatus of claim 18, wherein the action comprises reading one or more overhead parameter messages in the second network.

21. An apparatus for communicating with first and second networks via first and second radio access technologies (RATs), comprising:
means for measuring a time cross-reference between frames of the first RAT and frames of the second RAT while maintaining a connection with the first network via the first RAT;
means for sending a request to a base station of the first network to establish a sleep mode period during which the apparatus may switch to the second network to monitor for paging messages; and
means for switching to the second network to monitor for paging messages during a sleep window of the sleep mode period of the first network without terminating the connection with the first network.

22. The apparatus of claim 21, further comprising:
means for terminating the connection with the first network in response to detecting a paging message during a sleep period.

23. The apparatus of claim 22, wherein the means for terminating the connection with the first network comprises:
means for switching from the second network to the first network in response to detecting a paging message during the sleep period;
means for sending a deregistration request to the first network; and
means for switching to back to the second network to reply to the previously detected paging message.

24. The apparatus of claim 21, wherein the means for measuring a time cross-reference between frames of the first RAT and frames of the second RAT comprises:
means for determining a frame number of frames of the first RAT;
means for determining a frame number of the corresponding frames of the second RAT; and
means for calculating a time cross-reference based on a scaling factor selected to compensate for the difference in length of frames of the first RAT and frames of the second RAT.

25. The apparatus of claim 21, further comprising:
- means for calculating a start frame, a sleep window duration, and a listening window duration based, at least, on the time cross-reference; and
- wherein the sleep mode period request message contains the calculated start frame, sleep window duration, and listening window duration to initiate sleep mode operations with sleep windows that align with paging cycles of the second RAT.

26. The apparatus of claim 25, wherein the sleep mode period request message is an enhanced mobile sleep request (MOB_SLP-REQ) message configured with a 16-bit start frame field, a 16-bit listening window duration field, and a flag indicating whether or not the calculated start frame, sleep window duration, and listening window duration are mandatory.

27. The apparatus of claim 25, further comprising:
- means for receiving a mobile sleep response message from the base station of the first network after the occurrence of the previously calculated start frame included in the sleep mode period request message;
- means for cancelling the previously sent sleep mode period request message;
- means for calculating a new start frame based, at least, on the time cross-reference; and
- means for sending a new sleep mode period request message to the base station of the first network, wherein the new sleep mode period request message contains the new calculated start frame.

28. The apparatus of claim 21, further comprising:
- means for sending a request to a base station of the first network to establish a one-time sleep mode period to perform an action in the second network.

29. The apparatus of claim 28, wherein the action comprises performing a registration in the second network.

30. The apparatus of claim 28, wherein the action comprises reading one or more overhead parameter messages in the second network.

31. A computer-program product for communicating by a multi-mode mobile station (MS) with first and second networks via first and second radio access technologies (RATs), comprising a computer readable medium having instructions stored thereon, the instructions being executable by one or more processors and the instructions comprising:
- instructions for measuring a time cross-reference between frames of the first RAT and frames of the second RAT while maintaining a connection with the first network via the first RAT;
- instructions for sending a request to a base station of the first network to establish a sleep mode period during which the MS may switch to the second network to monitor for paging messages; and
- instructions for switching to the second network to monitor for paging messages during a sleep window of the sleep mode period of the first network without terminating the connection with the first network.

32. The computer-program product of claim 31, wherein the instructions further comprise:
- instructions for terminating the connection with the first network in response to detecting a paging message during a sleep period.

33. The computer-program product of claim 32, wherein the instructions for terminating the connection with the first network comprises:
- instructions for switching from the second network to the first network in response to detecting a paging message during the sleep period;
- instructions for sending a deregistration request to the first network; and
- instructions for switching to back to the second network to reply to the previously detected paging message.

34. The computer-program product of claim 31, wherein the instructions for measuring a time cross-reference between frames of the first RAT and frames of the second RAT comprises:
- instructions for determining a frame number of frames of the first RAT;
- instructions for determining a frame number of the corresponding frames of the second RAT; and
- instructions for calculating a time cross-reference based on a scaling factor selected to compensate for the difference in length of frames of the first RAT and frames of the second RAT.

35. The computer-program product of claim 31, further comprising:
- instructions for calculating a start frame, a sleep window duration, and a listening window duration based, at least, on the time cross-reference; and
- wherein the sleep mode period request message contains the calculated start frame, sleep window duration, and listening window duration to initiate sleep mode operations with sleep windows that align with paging cycles of the second RAT.

36. The computer-program product of claim 35, wherein the sleep mode period request message is an enhanced mobile sleep request (MOB_SLP-REQ) message configured with a 16-bit start frame field, a 16-bit listening window duration field, and a flag indicating whether or not the calculated start frame, sleep window duration, and listening window duration are mandatory.

37. The computer-program product of claim 35, further comprising:
- instructions for receiving a mobile sleep response message from the base station of the first network after the occurrence of the previously calculated start frame included in the sleep mode period request message;
- instructions for cancelling the previously sent sleep mode period request message;
- instructions for calculating a new start frame based, at least, on the time cross-reference; and
- instructions for sending a new sleep mode period request message to the base station of the first network, wherein the new sleep mode period request message contains the new calculated start frame.

38. The computer-program product of claim 31, further comprising:
- instructions for sending a request to a base station of the first network to establish a one-time sleep mode period to perform an action in the second network.

* * * * *